US Patent [19]  Welk

[11] 4,360,853
[45] Nov. 23, 1982

[54] CAPACITOR VOLTAGE AND TRIP COIL IMPEDANCE SENSOR WITH HIGH VOLTAGE ISOLATION

[75] Inventor: Steven Welk, Lansdale, Pa.

[73] Assignee: Brown Boveri Electric Inc., Rolling Meadows, Ill.

[21] Appl. No.: 294,147

[22] Filed: Aug. 19, 1981

[51] Int. Cl.³ .............................................. H01H 3/26
[52] U.S. Cl. .................................. 361/115; 307/140; 340/660; 361/156; 361/187
[58] Field of Search ................ 361/92, 115, 156, 187; 340/635, 654, 660, 662, 663; 307/140, 143; 324/133

[56] References Cited

U.S. PATENT DOCUMENTS 3,670,175  6/1972  Zinck-Petersen et al. ...... 307/140 X
3,678,339  7/1972  Sun et al. .......................... 361/115
3,780,349  12/1973 Nitta et al. ......................... 361/115

Primary Examiner—Harry E. Moose, Jr.
Attorney, Agent, or Firm—Ostrolenk, Faber, Gerb & Soffen

[57] ABSTRACT

A sensing circuit is disclosed for simultaneously and continuously monitoring the impedance of a trip coil of the type used to actuate synchronously operated circuit breakers, and the charge on a capacitor used to power the trip coil. The sensor comprises a circuit including the trip coil, the capacitor, a large resistance and a photo-diode connected together in series. A d.c. voltage is continuously applied across the capacitor, maintaining it charged and causing a constant direct current to flow through the other three components. The magnitude of the current will fall below a predetermined threshold value if either the capacitor voltage, which is proportional to the charge stored on the capacitor, falls below a certain level or the resistance of the trip coil rises above a certain level. The photo-diode produces a light signal representative of the current therethrough. The light signal is conveyed by an electrically insulative but optically transmissive medium, preferably an optical fiber bundle, to a circuit at ground potential which produces an indication of the magnitude of the light signal. Preferably the latter circuit comprises a relay which is closed when the photo-diode current is above the threshold level and open whenever the photo-diode current falls below the threshold level, indicating a fault in either the capacitor or the trip coil.

9 Claims, 1 Drawing Figure

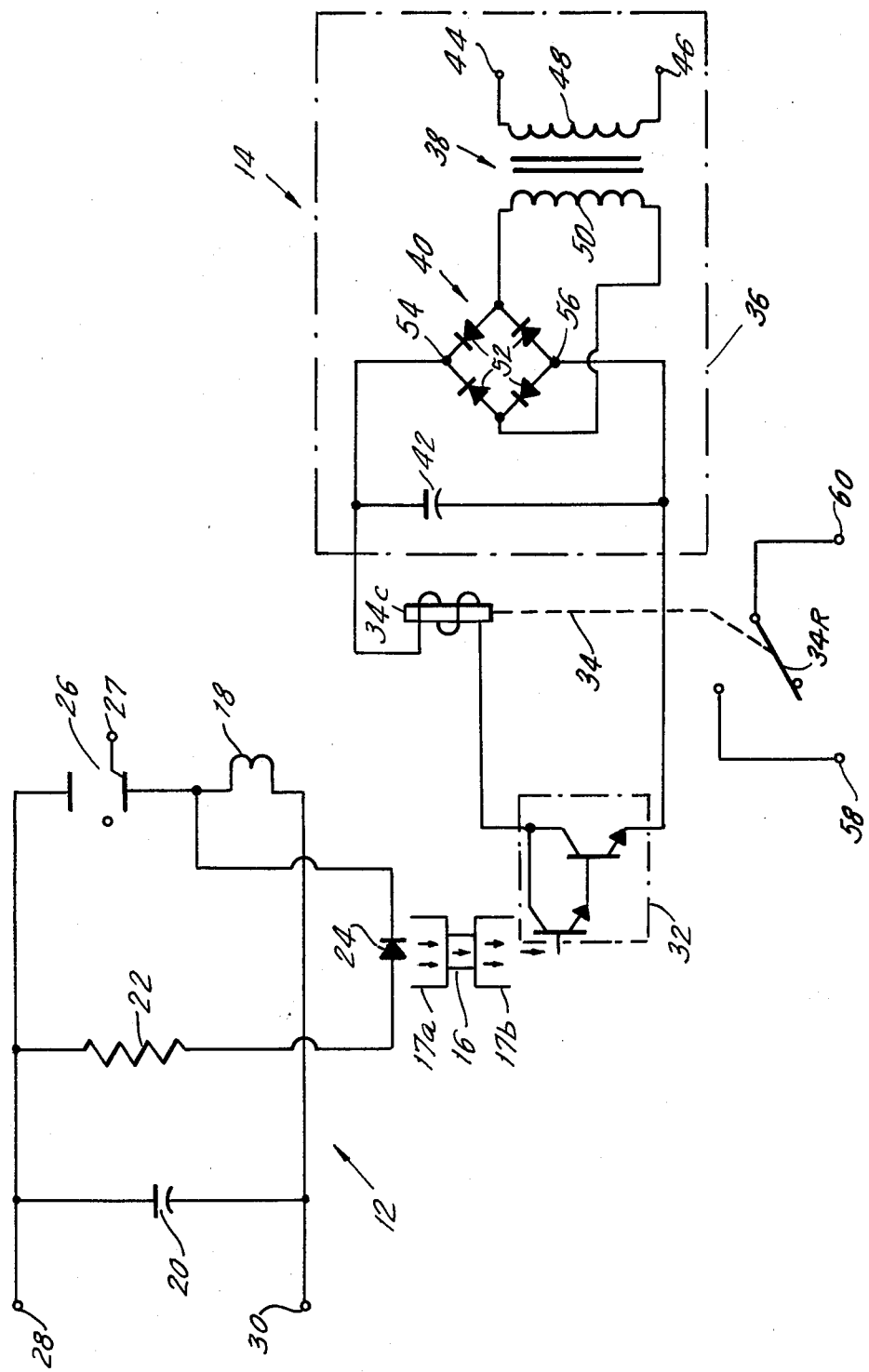

CAPACITOR VOLTAGE AND TRIP COIL IMPEDANCE SENSOR WITH HIGH VOLTAGE ISOLATION

BACKGROUND OF THE INVENTION

The present invention pertains to a device for simultaneously and continuously monitoring both the impedance of a trip coil and the voltage across a capacitor used to actuate the trip coil, and pertains more specifically to a sensor device for use with a coil and capacitor used in conjunction with equipment that must be maintained at voltages into the UHV range (5-2,000 kV).

Circuit breakers are known in which a trip coil, or Lenz coil is used to operate the interrupter. Such a system comprises a Lenz coil and a movable repulsion disc magnetically coupled to the Lenz coil. The movable disc is usually fixed to or is an integral part of the movable contact of the interrupted. To actuate the interrupted, a large current is suddenly caused to pass through the Lenz coil, producing a strong repulsive force between the Lenz coil and the movable repulsion disc in accordance with Lenz's law.

A very fast initial response can be obtained using an operating mechanism of this type, and such mechanisms are highly controllable, making them very suitable for use in the synchronous type of circuit breaker. A Lenz coil system, however, can provide high acceleration only for a short time since, as the gap between the disc and the coil increases, the net repulsive force between them decreases very rapidly. To overcome this deficiency, it is possible to add a mechanical assist to the system so that the opening force can be maintained at a high level for a longer time. For example, it is well known to couple a pneumatic system to an electrodynamically operated system for operating a circuit interrupter, as shown for example in U.S. Pat. No. 4,209,680, issued June 24, 1980, to Ruben D. Garzon for a *HIGH SPEED ACTUATING MECHANISM*, and U.S. Pat. No. 3,821,506, issued June 28, 1974, to Lorne D. McConnell, for an *INFLATED VALVE SEAT FOR SYNCHRONOUS BREAKERS*. Both of these patents are assigned to the assignee of the present application.

In circuit breaker operating mechanisms employing a Lenz coil, it is desirable to monitor the capacitor to ensure that a sufficient amount of energy is stored therein to actuate the opening stroke of the interrupter, as well as to monitor the trip coil to ensure that no damage has occurred to it during previous operation of the interrupter. Conventional monitoring equipment is relatively cumbersome. In addition, since the capacitor and the trip coil are at the potential of the line in which the interrupter is placed, it is necessary to isolate the monitoring equipment, which must be at the same high potential as the capacitor and trip coil, from ground potential. On the other hand, a device must be provided to indicate the condition of the capacitor and trip coil to personnel. This device must clearly be at ground potential. To isolate the monitoring equipment proper from the status indicating device at ground potential, an isolation transformer is commonly used. Such a transformer is relatively bulky and expensive. Moreover, in the event of a transformer breakdown, there is a danger that the isolation between the monitoring device proper and the status indicating device at ground potential may be degraded, with the resulting possibility of serious or even fatal injury to personnel.

SUMMARY OF THE INVENTION

It is accordingly the principal object of the invention to provide a simple device for simultaneously monitoring the capacitor and the trip coil of an electrodynamic operating mechanism employing a Lenz coil, which sensor is free of the disadvantages of the prior art described above.

It is another object of the invention to provide such a sensor the grounded, status indicating portion of which can be isolated from the detector proper regardless of the potential at which the latter must be maintained.

It is still another object of the invention to provide such a sensor in which such isolation can be provided without the use of an isolating transformer.

It is yet another object of the invention to provide such a sensor in which fiber optics is employed to provide the required isolation.

It is yet another object of the invention to provide a simple sensor circuit that will not degrade the electrodynamic performance of the trip coil circuit.

It is still another object of the invention to provide such a sensor that will be immune to false signals and to damage due to the high electromagnetic interference and induced currents associated with a Lenz coil located very close to the power circuit and arcing region of an interrupter.

It is still a further object of the invention to provide a sensor of the type described above that employs a relatively small number of components.

It is yet another object of the invention to provide a sensor of the above-described type that can with minor design modifications be adapted for use in virtually any type of breaker employing a Lenz coil operating mechanism, at virtually any voltage, permitting the production of a family of sensors employing substantially the same components except for the amount of optical fiber.

It is yet another object of the invention to provide such a sensor in which the final output signal, read by ground personnel, is completely decoupled from the detector proper, thus eliminating ground loops and providing isolation from severe shifts in the ground potential.

It is still another object of the invention to provide such a sensor in which the output signal is produced by the operation of a common relay contact.

According to the present invention, the sensor comprises a detector circuit at high potential, a status indicating circuit at ground potential, and an optical link between them. The detector circuit comprises the trip coil and the capacitor being monitored, a large resistance and a photo-diode connected with each other in series. In operation a constant d.c. voltage is applied to the capacitor, maintaining it charged at that voltage, except in the presence of a failure such as an internal short, or a failure of the capacitor charging circuit. The applied d.c. voltage produces a direct current through the other three components listed above, the magnitude of which current varies as a function both of the voltage across the capacitor and of the d.c. resistance of the trip coil. As is explained below, the magnitude of this current will fall below a predeterminable threshold value when either the capacitor has failed or the trip coil has been damaged in such a manner as to make it likely to fail. Accordingly, monitoring the current enables one to determine whether a failure has occurred in the operating mechanism.

The photo-diode produces a light signal whose strength is proportional to the current passing through it. The light signal is transmitted by means of the optical link, which is a light transmissive, but electrically insulative, medium such as an optical fiber bundle. One end of the link is secured to the photoelement and is therefore at the potential of the detecting circuit, which may typically be for example in the range 5-2,000 kV. The other end of the light transmissive medium is at ground potential, and is coupled to the status indicating circuit, which produces a final output signal indicative of whether the current in the detector circuit is above or below the threshold level. In the preferred embodiment, the status indicating circuit comprises a photodarlington which is used to control the current through a common relay, either solid state or electromechanical, the state of which (i.e. open or closed) indicates whether the detector circuit current is above or below the threshold value. The relay is used to produce a visual or other easily perceptible signal to alert personnel to the problem, and can also be used to disable the control circuitry of the interrupter that employs the monitored operating mechanism, to prevent the interrupter from being automatically reclosed if a failure has occurred in the capacitor or is likely to occur in the trip coil.

Other objects and features of the invention will be apparent from the following description and the accompanying drawings.

BRIEF DESCRIPTION OF THE FIGURE

The FIGURE is a schematic diagram of one embodiment of a sensor constructed according to the principles of the invention.

DETAILED DESCRIPTION OF THE PREFERRED EMBODIMENT

As shown in the FIGURE, the preferred embodiment of the invention comprises a detector circuit 12, a status indicating circuit 14 and, connecting them, an optical fiber bundle 16. The detector circuit 12 is disposed adjacent the operating mechanism and is therefore at line voltage, which may range as high as 2,000 kV. The status indicating circuit 14 is at ground potential. The only connection between the detector circuit 12 and the status indicating circuit 14 is the optical fiber bundle 16, which is optically transmissive but electrically insulative. The optical fiber bundle 16 can be made of arbitrary length, so that any desired degree of insulation between the detector circuit 12 and the status indicating circuit 14 can be achieved. In view of this, no other isolating device is necessary, and in particular, the bulky isolating transformers heretofore commonly used for this purpose can be dispensed with completely.

The detector circuit 12 comprises the trip coil or Lenz coil 18 itself, the capacitor 20 used to store energy for actuating the operating device, a resistance 22 and a photo-diode 24, all connected in series. An ignitron 26 is connected in parallel with the combination of resistance 22 and photo-diode 24. Instead of the ignitron 26 shown, a semi-conductor controlled rectifier or other switching device may be used. Terminals 28 and 30 are used to apply a d.c. voltage to the capacitor 20.

The application of a d.c. voltage across terminals 28 and 30, with the higher potential at 28, charges capacitor 20 and establishes a direct current through the resistance 22, the photo-diode 24 and trip coil 18. To actuate the operating mechanism, ignition 26 is fired by means of an appropriate signal applied to terminal 27. This renders ignition 26 conductive, short-circuiting resistance 22 and allowing the capacitor 20 to discharge with great rapidity through the trip coil 18.

The status indicating circuit 14 comprises, in the preferred embodiment shown, a photodarlington 32 and a relay 34 which is indicated in the figure as having a coil 34C and a contact 34R controlled by coil 34C. The status indicating circuit 14 also comprises a power supply circuit 36, whose output is applied to the coil 34c. The photodarlington 32 is connected in series with coil 34c and acts as a switch to control the current therethrough. The power supply 36 includes a transformer 38, a full wave rectifier 40 and a filtering capacitor 42. A suitable a.c. voltage, for example 110 volts, is applied to the terminals 44, 46 of the primary winding 48 of the transformer 38. A suitable lower output voltage appears across the secondary winding 50 of the transformer 38. Rectifier 40 comprises four diodes 52 connected to each other and to the ends of the secondary winding 50 in a well known manner to produce a d.c. output, which appears between terminals 54 and 56 of rectifier 40. The output of rectifier 40 is applied across the filtering capacitor 42, which smooths out the ripples in the rectified voltage. The smoothed output is applied, as stated above, to the coil 34c of the relay 34.

Relay 34, which although it is shown as an electromechanical relay could also be a solid state relay, cooperates with suitable control logic circuitry to produce an output signal across terminals 58, 60 that indicates whether a failure has occurred, or is imminent, in the trip coil operating mechanism. Such conventional logic includes, typically, means for giving a visual or other signal to personnel indicating the status of the operating mechanism and, in the event a failure is present or likely to occur, disables the circuit breaker control mechanism to prevent it reclosing the breaker after interruption.

The optical fiber bundle 16 preferably has its ends secured to the casings of the photo-diode 24 and of the photodarlington 32, respectively, by means of threshold sleeves 17a, 17b affixed to the ends of the fiber optics bundle 16, although other means of connection could be substituted.

The operation of the sensor of the invention can now be described.

As noted above, a d.c. voltage V is applied across terminals 28 and 30, with the higher voltage at terminal 28, by conventional capacitor charging circuitry (not shown). If the capacitor 20 is sound, a voltage $V_{cap}$ equal to the applied voltage V appears across it. A constant direct current now flows through the series circuit defined by terminals 28 and 30, resistance 22, photo-diode 24, trip coil 18 and the charging circuitry. Applying Kirchhoff's voltage law to the current loop defined by the trip coil 18, capacitor 20, resistance 22 and photo-diode 24, we obtain:

$$0 = -V_{cap} + IR + V_P + IR_{coil} \qquad \text{(Equation 1)}$$

where I is the current flowing around the loop, $V_P$ is the forward voltage drop across photo-diode 24, R is the value of resistance 22 and $R_{coil}$ is the d.c. resistance of the trip coil 18. The current in the detector loop is then:

$$I = (V_{cap} - V_P)/(R + R_{coil}) \qquad \text{(Equation 2)}$$

It has been found that the most common types of failure for the charging capacitor 20 are internal shorts and failure of the capacitor charging circuit. All modes of capacitor failure have been found to result in the voltage across the capacitor 20 being less than desired. In the event that the trip coil 18 is damaged, it has been found that the result is to increase its d.c. resistance radically, from a small fraction of 1 ohm to a resistance that may typically lie in the range 20k-1.7M immediately before the occurrence of a failure of the coil 18.

From Equation 2, it will be apparent that either a drop in the voltage $V_{cap}$ across capacitor 20 or a rise in the impedance of the trip coil 18 will result in a decrease of the current I. It is thus possible to define a threshold current $I_t$ as follows:

$$I_t = (V_{min} - V_P)/(R + R_{max}) \qquad \text{(Equation 3)}$$

where $V_{min}$ is the minimum voltage across capacitor 20 that will enable the operating mechanism to function properly, and $R_{max}$ is the maximum d.c. resistance that the trip coil 18 will have under normal circumstances when no failure is imminent. It will be understood from this that by monitoring the current I in the detector loop, it is possible to determine the presence or imminence of a failure in the capacitor 20 or the trip coil 18.

The photo-diode 24 emits a light signal whose magnitude is proportional to the current flowing through the detector loop. The light signal is converted by optical fiber cable 16 from the detector circuit 12 to the analysis circuit 14. Photodarlington 32 converts the light signal into an electrical signal, which is amplified by the photodarlington 32 and used to control the circuit flowing in the coil 34c of relay 34. The components of the sensor of the invention are selected to have such magnitudes that when the detector loop current I falls below the threshold value $I_t$, the current in coil 34c will also fall sufficiently low to allow relay contact 34r to open, while if the detector loop current I is above threshold current $I_t$, the relay contact 34r will remain closed. The state of relay 34 thus indicates whether the threshold current $I_t$ indicative of a failures in the operating mechanism has been reached.

The threshold current in the relay 34, $I_{rt}$, is related to the threshold current $I_t$ of the detector loop by a proportionality factor CTR, which is the current transfer ratio of the detector circuit 12 and is determined by the properties of the photo-diode 24, the photodarlington 32 and the fiber optics cable 6, including the length of the latter. The choice of the CTR must be coordinated with the selection of the coil resistance of relay coil 34C and of the resistance 22. Once the CTR has been determined, the threshold relay current can be determined by:

$$I_{rt} = CTR(V_{min} - V_p)/(R + R_{max}) \qquad \text{(Equation 4)}$$

From the foregoing description it will be understood that once a sensor according to the invention has been designed for use with one electrodynamic Lenz coil operating mechanism, the task of redesigning the sensor for use in a breaker at a different high voltage consists merely of determining how much longer or shorter the optical fiber cable 16 should be to provide the desired amount of electrical insulation between the detector circuit and the status indicating circuit. The transmission loss of modern day optical fibers is extremely low. If the number of optical fiber junctions is kept the same, it is expected that there will be negligible change of the CTR for fiber optic cable lengths typically needed for the 5-2,000 KV range. Thus, an entire family of sensors suitable for use with different types of circuit breakers operating at different voltages can be designed easily and quickly from a single master design using only a small number of components.

In addition to the above advantages, the sensor of the invention can be used safely and reliably, virtually without regard to the potential at which the circuit breaker in question is maintained. No isolation transformers are necessary, reducing the bulk and cost the system. In addition, the output signal produced by relay contacts 34R is completely decoupled from the detector circuit, preventing ground loops and preventing the deleterious effects of severe ground potential shifts.

The present invention may be embodied in other specific forms without departing from the spirit or essential attributes thereof, and accordingly, reference should be made to the appended claims, rather than to the foregoing specification, as indicating the scope of the invention.

What is claimed is:

1. A capacitor voltage and trip coil impedance sensor with high voltage isolation, and sensor comprising:
   a trip coil;
   capacitor means for storing a charge for rapid discharge through said trip coil;
   resistance means;
   photo-diode means connected in series with said trip coil, said capacitor means and said resistance means to define a current loop therewith, said photo-diode means being for generating a light signal representative of the current passing through said photo-diode means at each instant, whereby when a d.c. voltage is applied across said capacitor means to maintain a constant voltage thereacross, a constant direct current will flow through said current loop, and said photo-diode means will generate a light signal representative of the magnitude thereof;
   status indicating circuit means for indicating the amount of current passing through said photo-diode means at each instant responsive to said light signal, said status indicating means being electrically isolated from said current loop; and
   electrically insulative optically transmissive means for conveying said light signal from said photo-diode means to said status indicating circuit means.

2. The sensor of claim 1, wherein said status indicating circuit means is for generating a signal having a first value whenever said current in said current loop is greater than a predetermined threshold level and a second value different from said first value whenever said current in said current loop is below said predetermined threshold level.

3. The sensor of claim 1, wherein said status indicating circuit means comprises photoelectric means for generating an electrical signal representative of the magnitude of said light signal.

4. The sensor of claim 3, wherein said photoelectric means comprises a photodarlington circuit.

5. The sensor of claim 3, wherein said status indicating circuit means comprises relay means actuatable by said electrical signal whenever said current exceeds said predetermined threshold level.

6. The sensor of claim 5, wherein said relay means is adapted to be closed when said current is greater than said predetermined threshold level and open when said current is less than said predetermined threshold level.

7. The sensor of claim 1, wherein said electrically insulative optically transmissive means comprises an optical fiber bundle.

8. The sensor of claim 1, further comprising means for causing said capacitor means to discharge rapidly through said trip coil.

9. The sensor of claim 8, wherein said means for causing said capacitor means to discharge rapidly comprises an ignitron electrically connected in parallel with the combination of said resistance means and said photo-diode means.

* * * * *